United States Patent [19]

Steadman et al.

[11] Patent Number: 5,030,436
[45] Date of Patent: Jul. 9, 1991

[54] SPENT ACID PURIFICATION PROCESS

[75] Inventors: J. Francis Steadman, Orangeburg, S.C.; Dennis J. Malfer, Crestwood, Mo.; George A. Daniels, Baton Rouge, La.; J. Keitt Hane, Orangeburg, S.C.; R. Woodrow Wilson, Jr., Baton Rouge, La.

[73] Assignee: Ethyl Corporation, Richmond, Va.

[21] Appl. No.: 346,925

[22] Filed: May 3, 1989

[51] Int. Cl.$^5$ .................... C01B 21/20; C01B 17/90; C01B 17/94

[52] U.S. Cl. .................................. 423/523; 423/239; 423/522; 423/531

[58] Field of Search ............... 423/522, 523, 531, 239, 423/402

[56] References Cited

U.S. PATENT DOCUMENTS

| | | | |
|---|---|---|---|
| 2,198,686 | 4/1940 | Watson | 423/531 |
| 4,089,930 | 5/1978 | Kittrell et al. | 423/351 |
| 4,259,303 | 3/1981 | Nakaji et al. | 423/239 |
| 4,329,155 | 5/1982 | Schlegel | 423/531 |

FOREIGN PATENT DOCUMENTS 227905 10/1986 Japan.
105904 5/1987 Japan.

OTHER PUBLICATIONS

Olsen, *Unit Processes and Principles of Chemical Engineering*, D. Van Nostrand Co., Inc., 1932 pp. 1-3.
Skoog et al., *Fundamentals of Analytical Chemistry*, Holt Rinehart and Winston, 1963, p. 189.
Kim et al., Document SPSTL 779 Khp-D82.
Gaedke D. et al., Chem. Tech. (Leipzig) 35(4), pp. 203-205 (1983).
Mistrorico, Braz. Pedido. PI BR 79/7415, Jul. 22, 1980.

Primary Examiner—Gary P. Straub
Assistant Examiner—Stephen G. Kalinchak
Attorney, Agent, or Firm—John F. Sieberth

[57] ABSTRACT

Contaminants in spent nitric-sulfuric nitration acid can be removed by mixing the spent acid with urea and heating to 75°-150° C. Off-gas from the spent acid/urea reaction is passed through a Group IB, VB, VIB or VIII metal containing catalyst to decompose nitrous oxides and the so-treated off-gas is contacted with spent acid, denitrated spent acid, or fresh sulfuric acid, and optionally air (i.e. oxygen), to absorb oxides of nitrogen. The spent acid scrubbing fluid is then subjected to the same process for removing contaminants.

17 Claims, 1 Drawing Sheet

U.S. Patent
July 9, 1991
5,030,436
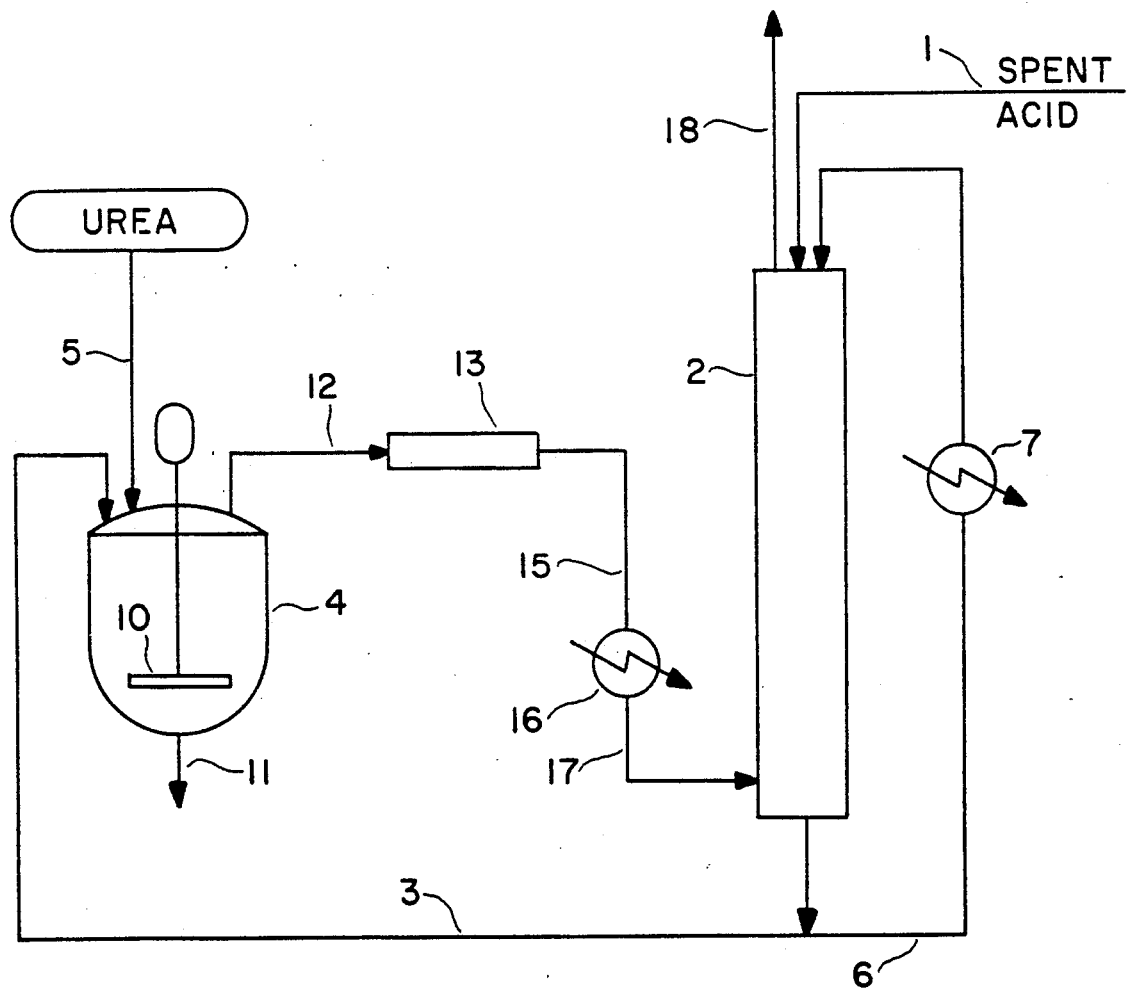

SPENT ACID PURIFICATION PROCESS

BACKGROUND

Aromatic hydrocarbons and aliphatic hydroxy compounds are routinely nitrated to form nitroaromatics and aliphatic nitrates using a mixed sulfuric/nitric nitration acid. Examples of the nitration products are trinitrotoluene, dinitrotoluene, nitrobenzene, nitroglycerin, butyl nitrate, amyl nitrate, hexyl nitrate, octylnitrate and the like. Nitration acids used in the nitration contain at least 65 weight percent $H_2SO_4$ and about 1-20 weight percent $HNO_3$. For example, a mixed acid containing 20 weight percent $HNO_3$ and 68 weight percent $H_2SO_4$ is a very effective nitration acid. When desired even higher $H_2SO_4$ concentrations can be used including mixtures of oleum and nitric acid. Such nitration processes are well-known.

All of the nitration processes result in a spent nitration acid containing the initial $H_2SO_4$ and water and additional water formed in the nitration. The spent acid also contains residual nitric acid and usually small amounts of nitrous acid. Because of the nitrogen acid contamination, the spent acid presents a severe disposal problem. If these contaminants are removed there are numerous commercial uses for the resulting sulfuric acid.

SUMMARY

According to the present invention, spent nitration acid is decontaminated by mixing the spent acid with urea and heating the mixture to cause reaction of the urea with nitric and nitrous acid in the spent acid. Further heating can react all of the urea and drive off any gases formed in the reaction. The off-gases contain various oxides of nitrogen and cannot be vented to the atmosphere because of environmental factors. The off-gases are passed through a Group IB, IVB, VB or VIII metal-containing catalyst at high temperature to decompose nitrous oxide and the so-treated off-ga containing nitric oxide and nitrogen dioxide is passed through a scrubber in which the scrubbing fluid is spent nitration acid, denitrated spent acid or fresh sulfuric acid. The scrubbed off-gases can then be vented and the spent acid scrubbing fluid subjected to the same decontamination process.

DESCRIPTION OF THE PREFERRED EMBODIMENTS

A preferred embodiment of the process is a process for removing contaminants from a spent nitric-sulfuric nitrating acid to obtain a useful sulfuric acid, said process comprising:

(A) mixing (i) a spent nitration acid comprising about 60-80 weight percent $H_2SO_4$ and 0.1-5 weight percent $HNO_3$ and/or $HNO_2$ with (ii) sufficient urea to react with said $HNO_3$ and/or $HNO_2$ acid to form nitrogen and/or oxides of nitrogen, (B) heating the spent acid/urea mixture to a temperature that causes the reaction of said urea with said $HNO_3$ and $HNO_2$ to proceed and (C) continuing heating at a temperature which reacts any remaining residual urea and drives off residual oxides of nitrogen leaving a useful sulfuric acid product, (D) scrubbing the off-gas from steps (A), (B) and/or (C) with spent nitration acid to absorb said oxides of nitrogen and form an increased $NO_x$ spent acid and (E) recycling said increased $NO_x$ spent acid as at least part of the spent acid feed to step A.

DESCRIPTION OF THE DRAWING

The drawing is a flow diagram showing an embodiment of the spent acid decontamination process.

Spent acids used to nitrate alcohols such as butanol, pentanol, hexanol, 2-ethyl hexanol and the like contain about 60-80 weight percent $H_2SO_4$ and 0.1-5 weight percent $HNO_3$ plus minor amounts e.g. 0.001-2.0 weight percent of $HNO_2$. Large volumes of such nitrates are used as additives to raise the cetane number of diesel fuel. This entails the co-production of large volumes of spent acid. Most uses for the spent acid are foreclosed because of its nitric acid content. Removal of the nitric acid results in a marketable sulfuric acid.

The amount of urea added should be at least the stoichiometric amount required to decompose the $HNO_3$ and $HNO_2$ content of the spent acid according to the following equations.

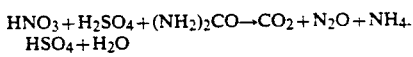

$$HNO_3 + H_2SO_4 + (NH_2)_2CO \rightarrow CO_2 + N_2O + NH_4HSO_4 + H_2O$$

$$2HNO_2 + (NH_2)_2CO \rightarrow 2N_2 + CO_2 + 3H_2O$$

This is seen to be one mole for each mole of $HNO_3$ and 0.5 moles for each mole of $HNO_2$. In practice a small excess of urea may be used to insure removal of all $HNO_3$ and $HNO_2$. A useful urea use level is about 0.9-5 moles per total moles of $HNO_3$ and $HNO_2$ in the spent acid. When only 0.9 moles of urea is used a small amount of nitric acid will remain in the spent acid. This residual amount of nitric acid might be desirable in some circumstances to inhibit corrosion if the denitrated spent acid is stored in stainless steel tanks. A preferred amount of urea is about 1.1-2 moles per total moles of $HNO_3$ and $HNO_2$ in the spent acid. Any excess urea remaining after decomposition of the $HNO_3$ and $HNO_2$ can be decomposed by heating to about 110-150° C.

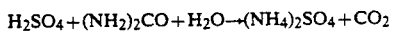

$$H_2SO_4 + (NH_2)_2CO + H_2O \rightarrow (NH_4)_2SO_4 + CO_2$$

The small amount of ammonium sulfate in the sulfuric acid is not considered detrimental in most uses such as in the manufacture of fertilizer.

The urea/spent acid mixture is heated to a temperature high enough to cause the reaction of urea with the $HNO_3$ and any $HNO_2$ that might be present. A useful temperature range is about 50-150° C., more preferably about 75-110° C.

Heating is continued to drive off the oxides of nitrogen formed in the reaction. This can be carried out at 50° C. for an extended period or at a higher temperature for a shorter period. A preferred temperature range is 75-200° C. and more preferably about 110-150° C.

The time required to complete the reaction of urea with nitric and nitrous acid will vary with temperature. A useful range is 1 minute to 4 hours. The time required to drive off oxides of nitrogen will also vary with temperature. It is usually complete in 10-60 minutes.

The resultant liquid is a sulfuric acid solution of about the same concentration as the starting spent acid. This is generally but not necessarily in the 60-80 weight percent $H_2SO_4$ range. Its concentration may be increased by adding $SO_3$. It finds a wide variety of uses where small amounts of impurities are not critical such as in the manufacture of fertilizers.

The off-gas from the process contains oxides of nitrogen. Emission of $NO_x$ is under federal regulation. A further embodiment of the invention is a modification which includes off-gas scrubbing to remove oxides of nitrogen. The scrubbing comprises contacting the off-gas from steps (A), (B) and/or (C) of the process with spent nitration acid to absorb the oxides of nitrogen into the spent nitration acid. The nitric oxide and nitrogen dioxide react with the spent acid to form nitrosyl sulfuric acid as follows:

$$2NO + HNO_3 + 3H_2SO_4 \rightarrow 3HSO_4NO + 2H_2O \quad (1)$$

$$HSO_4NO + H_2O \rightarrow H_2SO_4 + HNO_2$$

$$2NO_2 + H_2SO_4 \rightarrow HSO_4NO + HNO_3 \quad (2)$$

$$HSO_4NO + H_2O \rightarrow H_2SO_4 + HNO_2$$

The spent nitration acid scrubbing fluid is then subjected to a subsequent process of removing contaminants by reaction with urea carried out in the same way.

The off-gas is preferably cooled to 50° C. or lower prior to contacting the spent acid scrubbing fluid. Scrubbing is preferably conducted in a packed column in which the spent acid is fed at the top of the column and off-gas fed at the bottom to pass counter current to the spent acid up through the column and vent at the top. This vent gas should be monitored for $NO_x$ but if the scrubber achieves sufficient gas-liquid contact, it should be below federal $NO_x$ limits for release to the atmosphere.

In both cases nitric and/or nitrous acid form which can be readily removed by subsequent reaction with urea as previously described.

In a still further embodiment of this invention, the off-gas prior to scrubbing is passed through a catalyst bed at a elevated temperature to convert nitrous oxide to nitrogen and oxygen. This additional step to remove nitrous oxides is desirable but not critical because nitrous oxide at this time is not an EPA regulated emission.

Instead of placing a catalytic nitrous oxide decomposition step before the scrubbing step, the catalytic decomposition of nitrous oxide can be placed after the acid scrubbing step to remove nitrous oxide from the scrubber off-gas prior to venting to the atmosphere.

Useful catalysts include any of the metals or metal compounds known to catalyze oxidation. These include metals of group IB, VB, VIB and VIII. An especially useful catalyst is a nickel oxide either supported or unsupported.

The catalyst treatment of the off-gas is conducted at an elevated temperature. A useful temperature range is about 250-1000° C., more preferably 300-800° C. After passing through the catalyst bed, the off-gas is preferably cooled to 50° C. or lower prior to introduction to the scrubber.

The process can be conducted in a batch or continuous manner. In the batch process the spent acid and urea are charged to a reaction vessel and heated to cause reaction and drive off nitrogen oxides. In a continuous process, both spent acid and urea are continuously fed to a reaction zone held at reaction temperature, e.g. 75-200° C. Off-gas is conducted for further treatment and liquid product is continuously removed from the reaction vessel at a rate which maintains a constant liquid volume.

The continuous process can be conducted in two or more reaction vessels in series. The spent acid and urea are fed to the first reactor which overflows to a second reactor and so forth. Additional urea can be fed to the second or subsequent reactor if required. The first reactor can be maintained at about 50-150° C. and the second and any subsequent reactors at 75-200° C.

The following description of the process refers to the drawing which embodies a continuous variation of the process. Spent acid (77 weight percent $H_2SO_4$, 3 weight percent $HNO_3$) is continuously fed through conduit 1 to the top of scrubber 2 which is filled with acid resistant high surface packing. The feed rate is 1000 Kg/hr. Spent acid scrubbing fluid exits at the bottom of scrubber 2 and is conducted through conduit 3 to reactor 4.

A portion of the scrubbing fluid is recycled through conduit 6 and cooler 7 back to the top of scrubbing column 2. This serves to control the temperature in scrubbing column 2 to keep it below about 50° C.

Urea is fed through conduit 5 to reactor 4 at a rate of 30 Kg/hr. Stirrer 10 disperses the urea through the spent acid which is maintained at about 100° C. Treated sulfuric acid is continuously removed through conduit 11 at a rate which maintains a constant liquid volume of 1200 L in reactor 4. This results in an average residence time of about 2 hours. Off-gas is removed from reactor 4 through conduit 12 to catalyst bed 13 filled with extruded $Ni_2O_3$ catalysts and maintained at 500-700° C. The off-gas is then conducted through conduit 15 to heat exchanger 16 which lowers its temperature to 50° C. The cooled off-gas is then fed through conduit 17 to the bottom of scrubber 2. The off-gas passes upwardly through scrubber 2 to vent 18.

We claim:

1. A process for removing contaminants from a spent nitric-sulfuric nitrating acid to obtain a useful sulfuric acid, said process comprising:
   (A) mixing (i) a spent nitration acid comprising $H_2SO_4$ and $HNO_3$ and/or $HNO_2$ with (ii) urea to react with said $HNO_3$ and $HNO_2$ to form nitrogen and/or oxides of nitrogen, and an off gas of said nitrogen and/or oxides of nitrogen,
   (B) heating the spent acid/urea mixture to a temperature that causes the reaction of said urea with said $HNO_3$ and $HNO_2$ to proceed, whereby said off gas continues to be formed,
   (C) further heating at a temperature which decomposes residual urea, if any, and forms an off gas stream which contains oxides of nitrogen leaving a useful sulfuric acid product,
   (D) scrubbing the off-gas from steps (A), (B) and/or (C) with spent nitration acid to absorb said oxides of nitrogen and form an increased $NO_x$ spent acid and
   (E) recycling said increased $NO_x$ spent acid as at least part of the spent acid feed to step A,
   and said process being further characterized by contacting said off-gas from steps (A), (B) and/or (C) with a group IB, VB, VIB or VIII metal-containing catalyst to decompose nitrous oxide in said off-gas prior to said scrubbing.

2. A process of claim 1 wherein said temperature in step (B) is in the range of 75-110° C.

3. A process of claim 2 wherein said temperature in step (C) is in the range of 110-150° C.

4. A process of claim 1 wherein said metal-containing catalyst is maintained at a temperature of about 300-800° C. during said contacting of said off-gas.

5. A process of claim 4 wherein said metal-containing catalyst is an oxide of nickel.

6. A process of claim 5 wherein the temperature in step (B) is in the range of 75-110° C.

7. A process of claim 6 wherein the temperature in step (C) is in the range of 110-150° C.

8. A process of claim 1 wherein the amount of $HNO_3$ and/or $HNO_2$ together comprises less than about 20 weight percent of said spent nitration acid.

9. A process of claim 1 wherein said spent nitration acid comprises about 60-80 weight percent $H_2SO_4$ and about 0.1-5 weight percent $HNO_3$ and/or about 0.001-2.0 weight percent of $HNO_2$.

10. A process of claim 1 wherein the amount of said urea is sufficient to consume substantially the entire amount of said $HNO_3$ and/or $HNO_2$.

11. A process of claim 1 wherein the amount of said urea is insufficient to consume the entire amount of said $HNO_3$ and/or $HNO_2$.

12. A process of claim 9 wherein said temperature in step (B) is in the range of 75-110° C.

13. A process of claim 12 wherein said temperature in step (C) is in the range of 110-150° C.

14. A process of claim 10 wherein said metal-containing catalyst is maintained at a temperature of about 300-800° C. during said contacting of said off-gas.

15. A process of claim 14 wherein said metal-containing catalyst is an oxide of nickel.

16. A process of claim 15 wherein the temperature in step (B) is in the range of 75-110° C.

17. A process of claim 16 wherein the temperature in step (C) is in the range of 110-150° C.

* * * * *